Jan. 10, 1939.  P. OKEY  2,143,795
DIFFERENTIAL VAPOR PRESSURE APPARATUS
Filed Feb. 14, 1935  2 Sheets-Sheet 1

INVENTOR.
Perry Okey
BY
W. F. Babcock
ATTORNEY.

INVENTOR.
Perry Okey
BY
W. S. Babcock
ATTORNEY.

Patented Jan. 10, 1939

2,143,795

UNITED STATES PATENT OFFICE 2,143,795

DIFFERENTIAL VAPOR PRESSURE APPARATUS

Perry Okey, Columbus, Ohio, assignor to The University of Tennessee Research Corporation, Knoxville, Tenn., a corporation of Tennessee Application February 14, 1935, Serial No. 6,534

22 Claims. (Cl. 236—44)

The invention to be hereinafter described relates to differential vapor pressure apparatus.

This invention makes possible the determination of the absolute amount of vapor in an atmosphere of gas, or it may be arranged to control the amount of vapor in an atmosphere of gas.

The apparatus comprises a porous diaphragm, on one side of which is an atmosphere in which the content of the vapor which it is desired to measure or control is maintained constant, to serve as a standard. The other side of the diaphragm is exposed to the atmosphere, the vapor content of which it is desired to determine or control.

The diaphragm may be made of unglazed porcelain, kiln fired clay, carborundum, carbon or of many other materials. Such diaphragms are slightly porous or semi-permeable through exceedingly fine or minute pores.

Such diaphragms may be of a wide range of shapes and dimensions. One preferred form is a cylindrical shell of unglazed porcelain, as illustrated.

The total pressure of any atmosphere made up of a mixture of gases or of gases and vapor is, by Dalton's law, the sum of the partial pressures of the constituent gases or vapors.

Bearing in mind that the gas atmosphere on one side of the diaphragm is constantly maintained at a known degree of saturation, such, for example, as in a completely saturated state, as the standard of reference, the differential vapor pressure and consequently the operating pressure of the apparatus will vary inversely as the absolute quantity of vapor in the gas atmosphere on the other side of the diaphragm. For indicating or recording instruments, this quantity may be made to read weight of vapor in a pound of unknown atmosphere, or the instrument may be calibrated in per cent of vapor from zero to 100%, in the unknown atmosphere.

The apparatus herein disclosed operates by virtue of partial pressures. As an instance, if a cylindrical diaphragm be used, an internal pressure in excess of that outside will develop if the air inside the cylinder be maintained saturated with water vapor. The cause for the pressure may be explained as follows: the pressure of dry air inside and outside the cylinder is equal and the same, for the air molecules may freely penetrate the diaphragm in either direction and thus equalize the pressure, but inside the cylinder an additional pressure exists, due to the presence of the saturating water vapor. The pressure of the water vapor is equal to the pressure of saturated steam at the same temperature, so that inside the diaphragm the total pressure is the pressure of dry air plus the pressure of the vapor. The total pressure external to the porous cylinder is the pressure of dry air plus the pressure of the quantity of water vapor in the air. The external total pressure is always some value less than the total pressure inside the porous cylinder except when the external atmosphere is also completely saturated, which seldom occurs in nature. So, the pressure difference between the inside and outside of the diaphragm chamber varies, depending upon the ratios of water vapor in the exterior and interior atmospheres. That, of course, may be very readily indicated and/or recorded. And, likewise, it is equally feasible to indicate and/or record the weight of vapor in the mixture, since the weight of vapor in the external atmosphere varies directly as the pressure difference on the two sides of the diaphragm.

As hereinafter described, I maintain the atmosphere within the diaphragm chamber saturated with water vapor by means of a wick. The precise reason why this inside atmosphere remains saturated is somewhat obscure. One theory is that, although water vapor can normally diffuse through the porous diaphragm, such vapor, in the present case, is generated by the wick faster than it can escape through the diaphragm, and hence the vapor molecules accumulate, and maintain the air within the diaphragm chamber saturated. An alternate theory is that the diaphragm acts selectively by osmosis to permit the passage of air molecules more freely than water vapor molecules, so that the latter are relatively confined within the diaphragm. If this theory is correct, the space enclosed by the diaphragm may be designated an osmotic chamber.

I do not desire, however, to predicate the invention on any particular theory. Whatever the correct theory, I have found that the apparatus operates as described, and that the only difference in composition between the atmospheres inside and outside of the diaphragm chamber is the difference in vapor content.

In order to more clearly disclose the construction arrangement and operation of the apparatus reference should be had to the drawings accompanying this application. Throughout the several views like reference characters designate the same parts.

Figure 1:
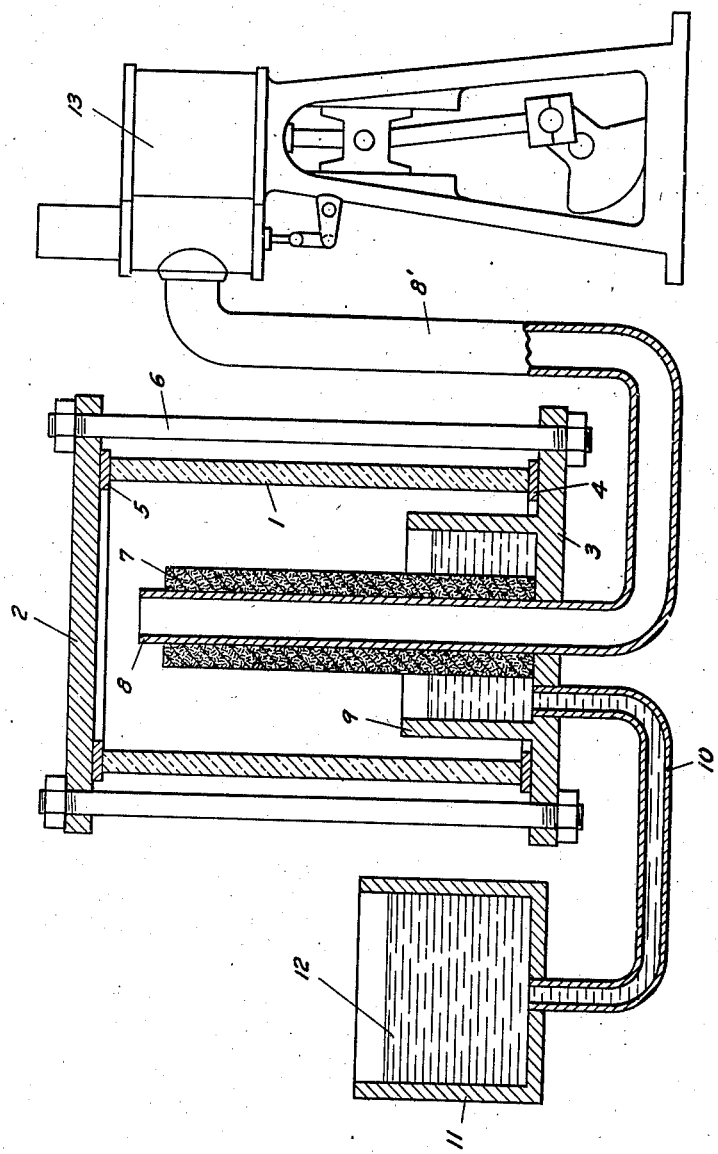
Figure 1 is a vertical cross-section through one of the preferred forms of the apparatus, and shows means for deriving mechanical work from the pressure developed.

One very simple and efficient apparatus for carrying out this invention is shown in Fig. 1. In this construction and arrangement, a porous diaphragm in the form of a simple cylindrical wall 1 of unglazed porcelain or similar semi-permeable material is used. Together with the end walls 2 and 3 it constitutes a closed osmotic or diaphragm chamber. In order to seal the chamber or make it tight against leakage, suitable packing rings or gaskets 4 and 5 are provided in well known manner, between the end walls of the diaphragm 1 and the end plates 2 and 3. Either end plate 2 or 3 may be made integral with the wall 1 if desired. And, of course, any well known and suitable material may be used for the wall 1 or either of the end plates. Clamping bolts 6 with tightening nuts are provided to draw the plates 2 and 3 to operative position. A well 9 is provided concentrically on the inner face of plate 3. It may be either integral therewith or separately formed and then attached, as desired. Obviously, too, the chamber, as above formed, may have various other shapes and may be of any one of a number of other suitable materials. An outlet or pressure tube 8—8' extends upwardly through the bottom of 3 to within a short distance of 2. As will be seen, it passes through the well 9. It is made gas-tight in its passage through 3. Surrounding this tube is an absorbent wick 7. In the instrument under discussion, water 12 is supplied by gravity from a small tank 11, through a pipe 10, to well 9, the arrangement being such that a simple gravity flow will keep the well 9 amply supplied to keep wick 7 saturated. This, in turn, continuously keeps the atmosphere within the chamber saturated, that is, in standard condition, so that the partial pressure of the vapor contained therein is constant. Normally, atmospheric air is not saturated. At any point less than saturation, there will be a partial air pressure and a partial water vapor pressure in the mixture. Since the atmosphere within is saturated, its water-vapor pressure is greater than that outside and the total pressure or air and water-vapor is greater, as previously explained. This increased pressure passes through tube 8—8' into the engine 13 and operates it just as steam or other pressure would. Should the outside atmosphere become saturated, there will be a balance and engine 13 will not operate. Likewise, the pressure and corresponding power applied to engine 13 will be in inverse proportion to the partial vapor pressure in the atmosphere. If there is very little water-vapor in the exterior air, there will be correspondingly increased water-vapor ratio within the cylinder and correspondingly increased power for engine 13.

The pressure developed inside the porous diaphragm, relative to that outside, is always proportional to the number of water-vapor molecules per cubic inch of air inside the cylinder or chamber (which, as above, is saturated) as compared with the number of water-vapor molecules in a cubic inch of air on the outside of the porous cylinder. This characteristic of the diaphragm is utilized to indicate and/or record the absolute weight of any particular vapor in a unit weight of air or gas.

Figure 2:
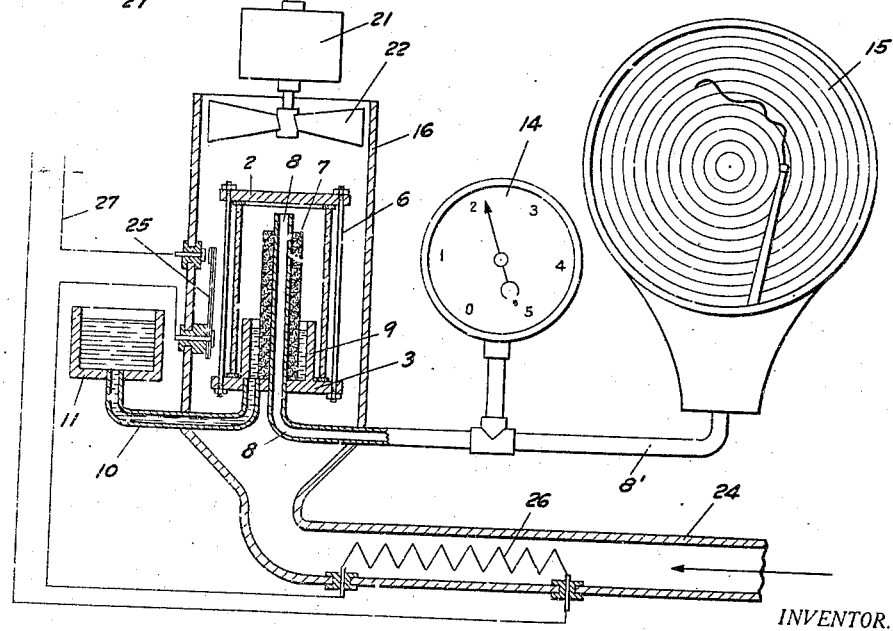
Figure 2 is a like view, with a pressure indicator and recorder, and with thermostatic heat control

Instead of operating an engine, the pressure or power through tube 8—8' may be utilized to operate an indicator 14 or a recorder 15, or both, as in Fig. 2. Obviously too, the indicator and/or recorder may be connected with the line in various arrangements other than the particular one shown. The indicating and recording mechanisms are well known and their connection and operation in such an assemblage is equally well understood. Accordingly, it is neither necessary nor advisable to further illustrate or describe them here.

In order to cause the outside atmosphere to flow over the diaphragm, so as to insure uniformity, the diaphragm may be enclosed in a suitably shaped duct 16 spaced sufficiently from the diaphragm to allow relatively free flow. The upper end of the duct is open and receives an induction fan 22 of any suitable type for drawing a current through the passage —see Figs. 2 and 3. It may be driven by any suitable type of motor 21—Figs. 2 and 3. The opposite end of duct 16 is connected by flue 24 with any chamber, the atmosphere of which it is desired to analyze or control. The indicator 14 and graph sheet of the recorder are so graduated and arranged as to accurately indicate and record the exact weight of vapor in the air, or, as the case may be, the question, all as will be readily understood.

When the apparatus is used for quantitative analysis of vapor in an atmosphere it is necessary, in order to avoid wide errors in the readings, to closely control the temperature of the air or gas passing the osmotic diaphragm and the liquid and wick contained therein. It has been found that if the temperature of the passing atmosphere is maintained constant the porous diaphragm and its contents will also be maintained at the same temperature. This temperature control may be obtained by a thermostat 25 mounted in the stream of atmosphere in close proximity to the osmotic chamber. The thermostatic controls electric current through wires 27 to the heating element 26 mounted inside the induction pipe 24—see Fig. 2. Obviously other methods of adding heat, thermostatically controlled, may be used.

Figure 3:
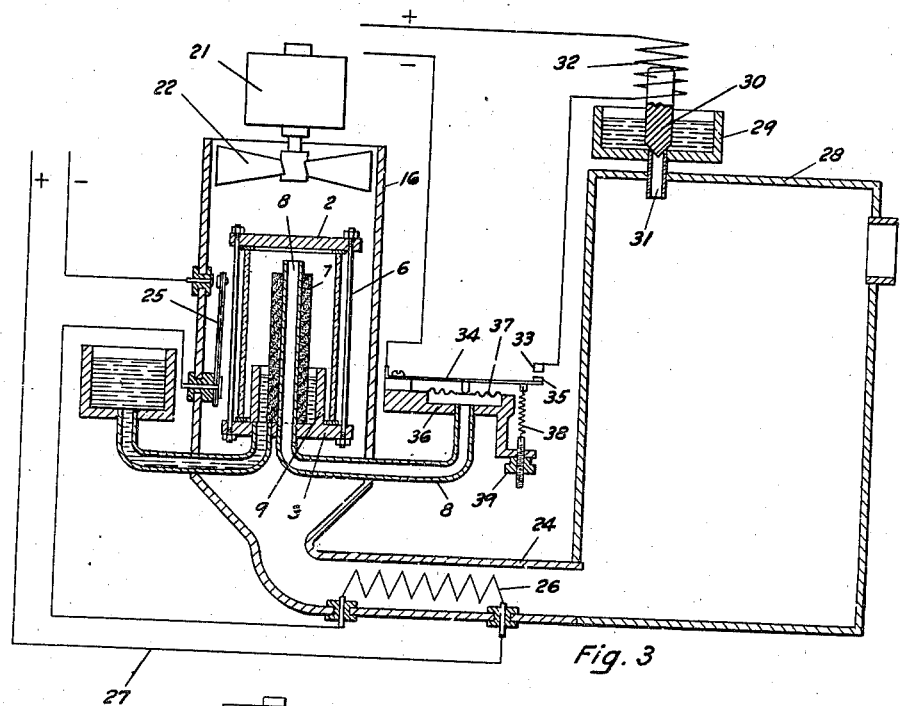
Figure 3 is a view similar to Figure 2, showing automatic vapor content control.

Figure 3 shows an apparatus for controlling the quantity of vapor of a liquid which it is desired to maintain in the atmosphere in a room or chamber. In this case, the induction tube 24 is connected to the interior of the chamber or room 28 in which it is desired to control the vapor percentage. The inducted atmosphere is drawn past the porous diaphragm 1, the same as in Figure 2, and the pressure developed therein is transmitted through tube 8 to chamber 36 which is equipped with a flexible diaphragm 37. This diaphragm, through changes in the relative pressures under and above it, operates through the spring 34 to control the opening and closing of electrical contacts 35 and 33 of a suitable circuit. Various types of humidifier may be electrically controlled by these contacts. The one shown comprises a vessel 29 containing liquid, the vapor of which is desired in the atmosphere of the room or chamber 28. Should the vapor content of this atmosphere become reduced below a predetermined point, the humidifier will be operated to correct the deficiency, as hereinafter shown. As explained, pressure transmitted to the diaphragm 37 will raise spring 34, making connection between contacts 35 and 33 of a suitable electric circuit and energizing solenoid 32 which raises core 30 formed with a valve at its lower end, which controls the flow of liquid from the vessel 29, through the nipple 31 and into chamber 28 where it may be vaporized by any means desired, not shown. The quantity of vapor in the chamber atmosphere may be maintained at any proportion desired by adjusting nut 39 which varies the tension of spring 38 attached to the spring contact arm 34. Increasing tension of spring 38 will decrease the vapor content.

In many industries it is desirable to ascertain and/or record the percentage of vapors of certain solvents contained in a mass or current of air. For such purpose it is only necessary to fill the tank of container 11 with the liquid whose vapor quantity is to be determined, and the pressure developed inside the porous cylinder or other shaped diaphragm relative to the pressure of the surrounding gas, will be proportional to the quantity of vapor of the liquid present in the air or gas passing through the induction tube, as was the case with water.

It is thought that the construction, operation and use of the apparatus of the invention, will be clear from the preceding detailed description.

Many changes may be made in the construction, arrangement and disposition, and in the materials of the various parts of the invention, within the scope of the appended claims, without in any degree departing from the field of the invention, and it is meant to include all such within this application wherein only one preferred form and a modification have been disclosed, purely by way of illustration and with no intention to in any degree limit the claims to or by any such illustrations.

Having thus described my invention, what I claim and desire to protect by Letters Patent is:—

1. An apparatus for determining vapor pressure in a gas comprising, an osmotic chamber adapted to be surrounded by said gas, means for creating and maintaining continuously therein an atmosphere of standard vapor pressure, fluid pressure transmission means communicating with said chamber, and mechanism operated by fluid pressure passing through said tranmission means.

2. An apparatus responsive to vapor pressure in a gas comprising, an osmotic chamber adapted to be surrounded by said gas, means for creating and maintaining continuously therein a standard vapor pressure, fluid pressure transmission means communicating with said chamber, and means actuated by fluid pressure passing through said transmission means.

3. An apparatus for determining vapor pressure in a gas comprising, an osmotic chamber adapted to be surrounded by said gas, a well therein, a wick in said well, means for supplying a liquid to said wick to create a standard vapor pressure within the chamber, fluid pressure transmission means communicating with said chamber and an indicator actuated by fluid pressure passing through said transmission means.

4. An apparatus for determining vapor pressure in an atmosphere comprising, an osmotic chamber exposed to said atmosphere, means for creating and maintaining continuously therein an atmosphere of standard vapor pressure, fluid pressure transmission means communicating with said chamber, and an indicator actuated by fluid pressure passing through said transmission means.

5. An apparatus for determining vapor pressure in a gas comprising, an osmotic chamber adapted to be surrounded by said gas, means for continuously maintaining therein an atmosphere of standard vapor pressure, fluid pressure transmission means communicating with said chamber, a mechanism operated by fluid pressure passing through said transmission means, and further means for maintaining constant temperature of the osmotic chamber and the atmospheres inside and outside of said chamber.

6. An apparatus for determining the vapor content in a gas, comprising an osmotic chamber adapted to be surrounded by said gas, means for continuously maintaining therein an atmosphere saturated with vapor, fluid pressure transmission means communicating with said chamber, and pressure operated mechanism connected to said transmission means.

7. An apparatus for determining the vapor content in a gas comprising an osmotic chamber adapted to be surrounded by said gas, means for continuously maintaining therein an atmosphere saturated with vapor, fluid pressure transmission means communicating with the said chamber, pressure operated mechanism connected to said transmission means, and further means maintaining the osmotic chamber and contacting atmospheres at constant temperature.

8. An instrument for indicating the partial pressure of a vapor in an atmosphere, comprising a closed chamber having a porous wall through which said atmosphere may diffuse, means within said chamber for continuously maintaining the atmosphere therein at a known degree of saturation and means for indicating the difference between the pressure of the atmosphere within said chamber and the atmosphere outside said chamber.

9. An instrument for indicating the saturation deficit of an atmosphere comprising a closed chamber having a porous wall exposed to said atmosphere, means for maintaining a water vapor saturated atmosphere within said chamber, and means for indicating the difference in pressure between the atmosphere within said chamber and the atmosphere outside of said chamber.

10. An instrument functioning by virtue of the partial pressure of a vapor in an atmosphere comprising a closed chamber having a porous wall exposed to said atmosphere and through which wall such atmosphere may diffuse, means within said chamber for maintaining constant the partial pressure of said vapor in the atmosphere within said chamber, and means responsive to the difference in pressure of the atmospheres inside and outside of said chamber.

11. Apparatus for determining vapor pressure in an atmosphere, comprising a closed chamber having a porous wall exposed to said atmosphere and through which wall such atmosphere may diffuse, a wick in said chamber whereby the atmosphere in said chamber is saturated with the vapor of a liquid held by the wick, and fluid pressure responsive means operatively connected with said chamber.

12. Apparatus for determining vapor pressure in an atmosphere, comprising a closed chamber having a porous wall exposed to said atmosphere and through which wall such atmosphere may diffuse, means for maintaining a vapor saturated atmosphere within said chamber, and fluid pressure responsive means operatively connected with said chamber.

13. Apparatus for determining vapor pressure in an atmosphere, comprising a closed chamber having a porous wall exposed to said atmosphere, a liquid reservoir associated with said chamber, a wick in said chamber and in contact with the liquid in said reservoir, whereby the atmosphere in said chamber is continuously maintained saturated with the vapor of said liquid, and fluid pressure responsive means operatively connected with said chamber.

14. Apparatus for determining vapor pressure in an atmosphere, comprising a closed chamber having a cylindrical porous wall exposed to said atmosphere, a wick disposed in said chamber axially of but spaced from said wall, a liquid reservoir into which said wick dips, whereby the atmosphere in said chamber is continuously maintained saturated with the vapor of said liquid, and fluid pressure responsive means operatively connected with said chamber.

15. An instrument functioning by virtue of the partial pressure of a vapor in an atmosphere comprising a closed chamber having a porous wall exposed to said atmosphere and through which wall such atmosphere may diffuse, means for maintaining constant the partial pressure of said vapor in the atmosphere within said chamber, and means responsive to the difference in pressure of the atmospheres inside and outside of said chamber.

16. An instrument functioning by virtue of the partial pressure of a vapor in an atmosphere comprising a closed chamber having a porous wall exposed to said atmosphere and through which wall such atmosphere may diffuse, means for maintaining the atmosphere within said chamber in vapor saturated condition, whereby the partial pressure of the vapor therein remains constant, and movable indicating means responsive to the difference in pressure of the atmospheres inside and outside of said chamber.

17. An instrument for indicating the partial pressure of a vapor in an atmosphere comprising a closed chamber having a porous wall, a liquid reservoir, a wick connecting the liquid in said reservoir with the interior of said chamber to maintain the internal atmosphere of said chamber in continuously saturated condition, and means for indicating the pressure difference between the internal and external atmospheres of said chamber.

18. An instrument for indicating the partial pressure of a vapor in an atmosphere comprising an enclosed chamber having a porous wall, a liquid reservoir associated with said chamber, a wick connecting said reservoir and said chamber whereby the atmosphere within said chamber is maintained saturated with vapor of the liquid within said reservoir, pressure-operated means disposed exteriorly of said chamber, and a pressure transmitting duct uniting the interior of said chamber with said pressure operated means.

19. An apparatus functioning by virtue of the partial pressure of a vapor in an atmosphere, said apparatus comprising a closed chamber having a porous wall exposed to said atmosphere through which wall said atmosphere may diffuse, means for maintaining the atmosphere within said chamber at a constant degree of saturation for any given temperature, and mechanical means movable in response to differences in pressure between the atmospheres immediately within and without the walls of said chamber.

20. An instrument responsive to vapor pressure in an atmosphere, comprising a closed chamber having a porous wall exposed to said atmosphere and through which wall such atmosphere may diffuse, means for maintaining the atmosphere within said chamber at a constant degree of saturation for any given temperature, mechanical means movable in response to differences in pressure between the atmospheres within and without said chamber, and means actuated by said mechanical means.

21. Apparatus for determining vapor pressure in an atmosphere, comprising a closed chamber having a porous wall exposed to said atmosphere and through which wall such atmosphere may diffuse, means for maintaining a vapor saturated atmosphere within said chamber, fluid pressure responsive means operatively connected with said chamber, a casing spaced from the walls of said chamber, said casing being in open communication with said porous wall, means for effecting positive advancement of the gases and vapors comprising said first-named atmosphere through said casing, and means for maintaining said atmosphere at a substantially uniform temperature during passage thereof through said casing.

22. Differential vapor pressure apparatus comprising a closed chamber, said chamber having a porous wall through which a gaseous atmosphere may diffuse, means for maintaining a vapor saturated atmosphere within said chamber so that the total pressure of the atmosphere within the chamber normally exceeds that of the atmosphere on the outside of said porous wall, a diaphragm movable in response to the difference in pressure inside and outside of said chamber, and means automatically actuated by the movement of said diaphragm.

PERRY OKEY.